(12) United States Patent
Watt et al.

(10) Patent No.: US 10,328,993 B2
(45) Date of Patent: Jun. 25, 2019

(54) BICYCLE STEERER TUBE WITH VARIANT STIFFNESS

(71) Applicant: SRAM, LLC, Chicago, IL (US)

(72) Inventors: Jonathan Blair Watt, Colorado Springs, CO (US); Robert Powell, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 888 days.

(21) Appl. No.: 14/585,629

(22) Filed: Dec. 30, 2014

(65) Prior Publication Data

US 2016/0185414 A1  Jun. 30, 2016

(51) Int. Cl.
*B62K 21/04* (2006.01)
*B62K 19/32* (2006.01)
*B62K 21/18* (2006.01)
*B62K 19/02* (2006.01)

(52) U.S. Cl.
CPC .............. *B62K 21/04* (2013.01); *B62K 19/32* (2013.01); *B62K 21/18* (2013.01); *B62K 19/02* (2013.01)

(58) Field of Classification Search
CPC ........ B62K 21/04; B62K 19/32; B62K 21/18; B62K 19/02
See application file for complete search history.

(56) References Cited

U.S. PATENT DOCUMENTS

| | | | |
|---|---|---|---|
| 5,649,738 A | 7/1997 | Thomson et al. | |
| 6,145,862 A * | 11/2000 | D'Aluisio | B62K 21/20 280/276 |
| 6,805,372 B2 | 10/2004 | Gueugneaud | |
| 6,893,037 B1 | 5/2005 | Galasso | |
| 7,503,576 B1 | 3/2009 | Schroeder | |
| 7,537,231 B2 * | 5/2009 | Callahan | B62K 19/32 280/276 |
| 7,909,346 B2 | 3/2011 | Moeching | |
| 8,128,112 B2 | 3/2012 | Moeching | |
| 8,366,130 B2 * | 2/2013 | Galasso | B62K 21/02 280/276 |
| 2005/0012299 A1 * | 1/2005 | Schuman | B62K 25/00 280/288.3 |
| 2007/0210554 A1 * | 9/2007 | Callahan | B62K 21/06 280/279 |
| 2007/0257466 A1 * | 11/2007 | Murphy | B62K 19/16 280/276 |
| 2008/0303240 A1 * | 12/2008 | Lewis | B62K 19/16 280/276 |
| 2010/0259028 A1 | 10/2010 | Moechnig | |

FOREIGN PATENT DOCUMENTS

| | | |
|---|---|---|
| CN | 2228046 Y | 5/1996 |
| CN | 202557710 U | 11/2012 |
| EP | 2930094 A1 | 10/2015 |
| FR | 902315 A | 8/1945 |
| WO | 0174654 A1 | 10/2001 |

* cited by examiner

*Primary Examiner* — Anne Marie M Boehler
*Assistant Examiner* — Marlon A Arce

(57) ABSTRACT

A bicycle steerer tube is adapted to reside in a plane of travel of the bicycle. A thickness at a point on the wall of the steerer tube body in a lower section thereof varies as a function of the cross-sectional angle of the point to the plane of travel, with the wall thickness being at a maximum in the plane of travel. An inner wall of the lower section may be elliptical, with a minor axis aligned with the plane of travel and a major axis orthogonal to the plane of travel.

65 Claims, 16 Drawing Sheets

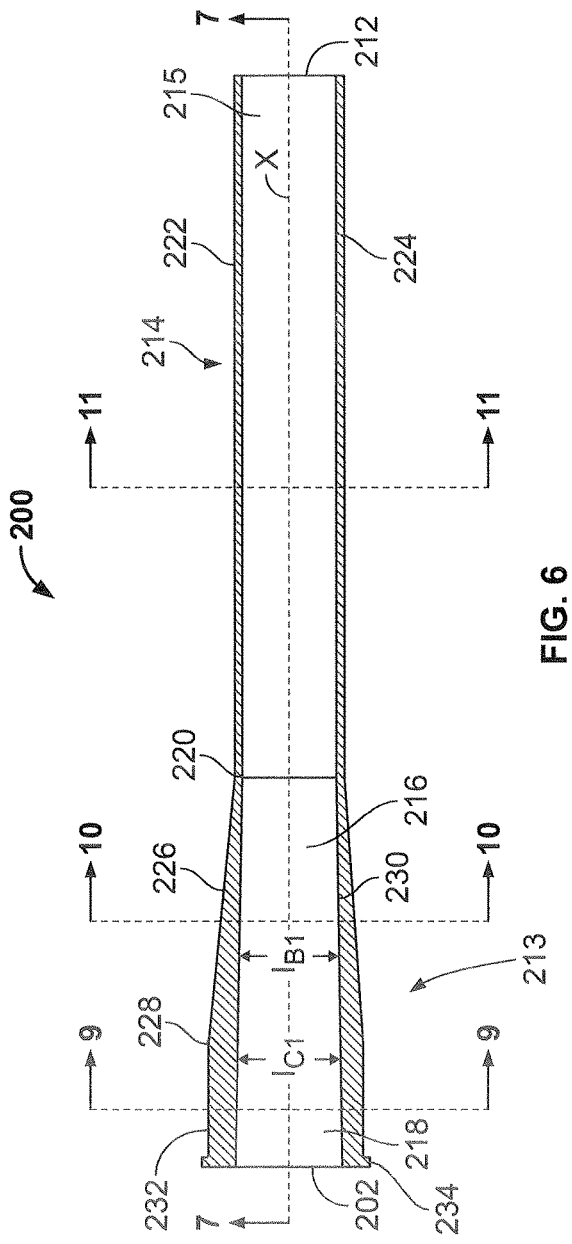
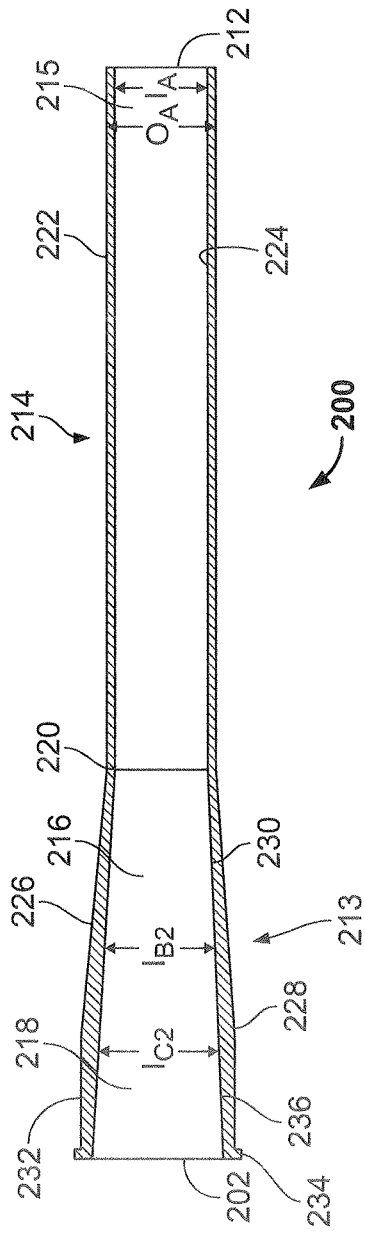

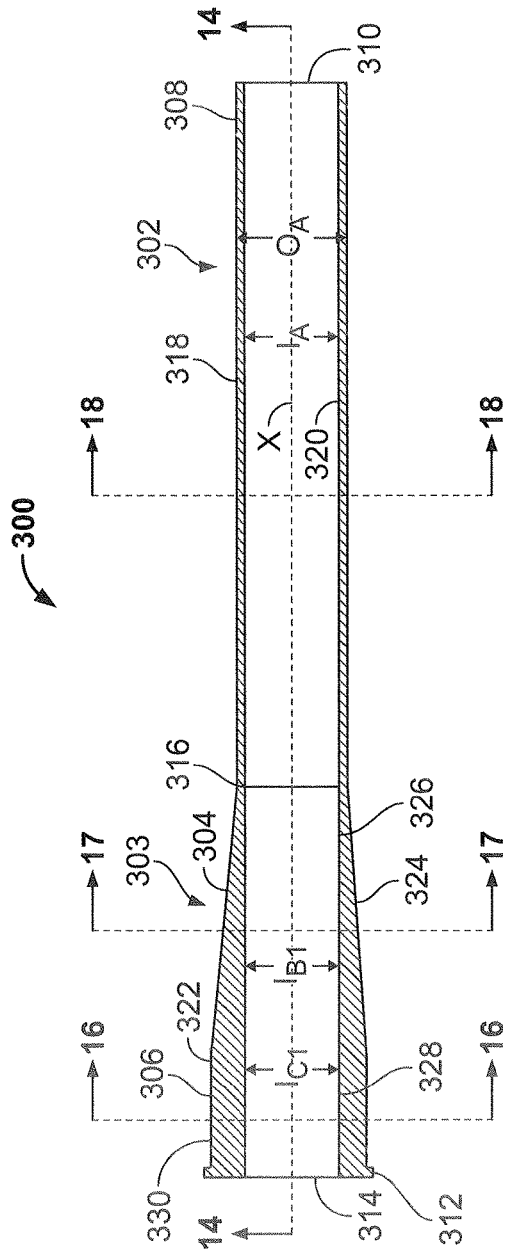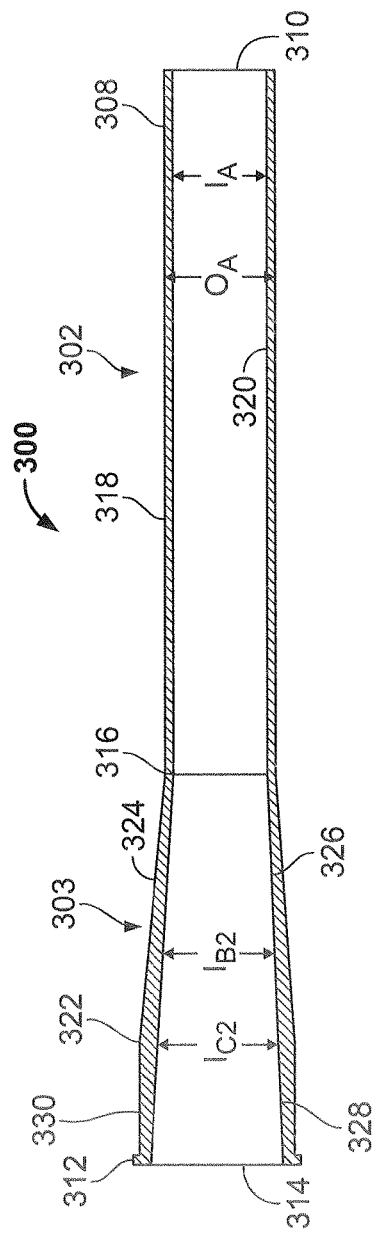
FIG. 13
FIG. 14

BICYCLE STEERER TUBE WITH VARIANT STIFFNESS

BACKGROUND OF THE INVENTION

This invention relates in general to bicycles, and more particularly to bicycle steerer tubes.

A conventional bicycle (a mountain bike is shown at 100 in FIG. 1) is steered by varying the plane of its front wheel 102 out of a plane of travel P, which is aligned with the running direction of the bicycle. This is done by linking the front wheel 102 to a rider-operated handlebar 104. The front wheel 102 is rotatably suspended between left and right tubes 106, 108 of a fork indicated generally at 110. The left and right fork tubes 106, 108 are joined, either in solid fashion or by shock absorbing apparatus, to a fork crown 112 positioned upward from the front wheel.

Referring to FIGS. 1 and 2, a steerer tube 200 has its lower end 202 affixed to the fork crown 112 and is disposed along an upwardly and usually rearwardly extending steering axis X. Axis X is within the plane of travel P. The steerer tube 200 is inserted into a coaxial head tube 204 that is part of a bicycle frame 206. Bearings are mounted between the steerer tube 200 and the head tube 204 to permit the free rotation of the steerer tube 200 relative to the head tube 204. The handlebar 104 is affixed in some fashion (as by a star nut, not shown) to an upper end 212 of the steerer tube, and permits the rider to impart torque to the steerer tube 200, the fork 110 and the front wheel 102, which in response rotate around the steering axis X as a unit. Thus, the rider may steer the bicycle 100 right or left as desired.

Many conventional steerer tubes are circularly cylindrical. A perfectly cylindrically circular steerer tube, having a uniform wall thickness, will exhibit a uniform stiffness longitudinally, or fore-and-aft and in alignment with plane of travel P, and laterally, or side-to-side and perpendicular to plane of travel P and axis X. But uniformly thick and stiff steerer tubes do not take into account the differences in loads on the steerer tube and stability, comfort and steering requirements.

SUMMARY OF THE INVENTION

According to one aspect of the invention, a bicycle steerer tube has an elongate hollow body that is arranged around a steering axis of the bicycle. The steering axis is located in a vertical plane of travel of the bicycle. A segment of an upper section of the body is adapted to be joined to a bicycle handlebar. A segment of a lower section of the steerer tube body is adapted to be joined to a crown of a front wheel fork. The lower and upper sections of the steerer tube body are joined together. The body of the steerer tube is formed by a wall. The thickness of the wall at any point in the lower section of the body varies as a function of the cross-sectional angle of the point relative to the plane of travel, the wall thickness being at a maximum in the plane of travel of the bicycle.

In some embodiments of the invention, the outer surfaces of the upper and lower sections of the steerer tube body are circular in cross section. In some embodiments of the invention, the wall thickness is at a minimum in a plane containing the steering axis and orthogonal to the plane of travel of the bicycle. In some embodiments of the invention, at least a portion of the inner surface of the wall is formed as an ellipse in cross section, with a major diameter of the ellipse being formed to be perpendicular to the plane of travel, and a minor diameter of the ellipse being formed to be in the plane of travel.

Steerer tubes according to the invention have a large stiffness and strength in the fore and aft plane of travel of the bicycle. But since side bending stiffness isn't as critical due to lighter side loads, the wall thickness outside of the plane of travel may be reduced. This permits a lighter weight steerer tube that nonetheless meets all loading requirements.

BRIEF DESCRIPTION OF THE DRAWINGS

Further aspects of the invention and their advantages can be discerned in the following detailed description, in which like characters denote like parts and in which:

FIG. 6 is an axial sectional view taken substantially along line 6-6 of FIG. 3;

FIG. 7 is an axial sectional view taken substantially along line 7-7 of FIG. 3;

FIG. 13 is an axial sectional view of a steerer tube according to another embodiment of the present invention;

FIG. 14 is an axial sectional view taken substantially along line 14-14 of FIG. 13;

DETAILED DESCRIPTION

Figure 1:
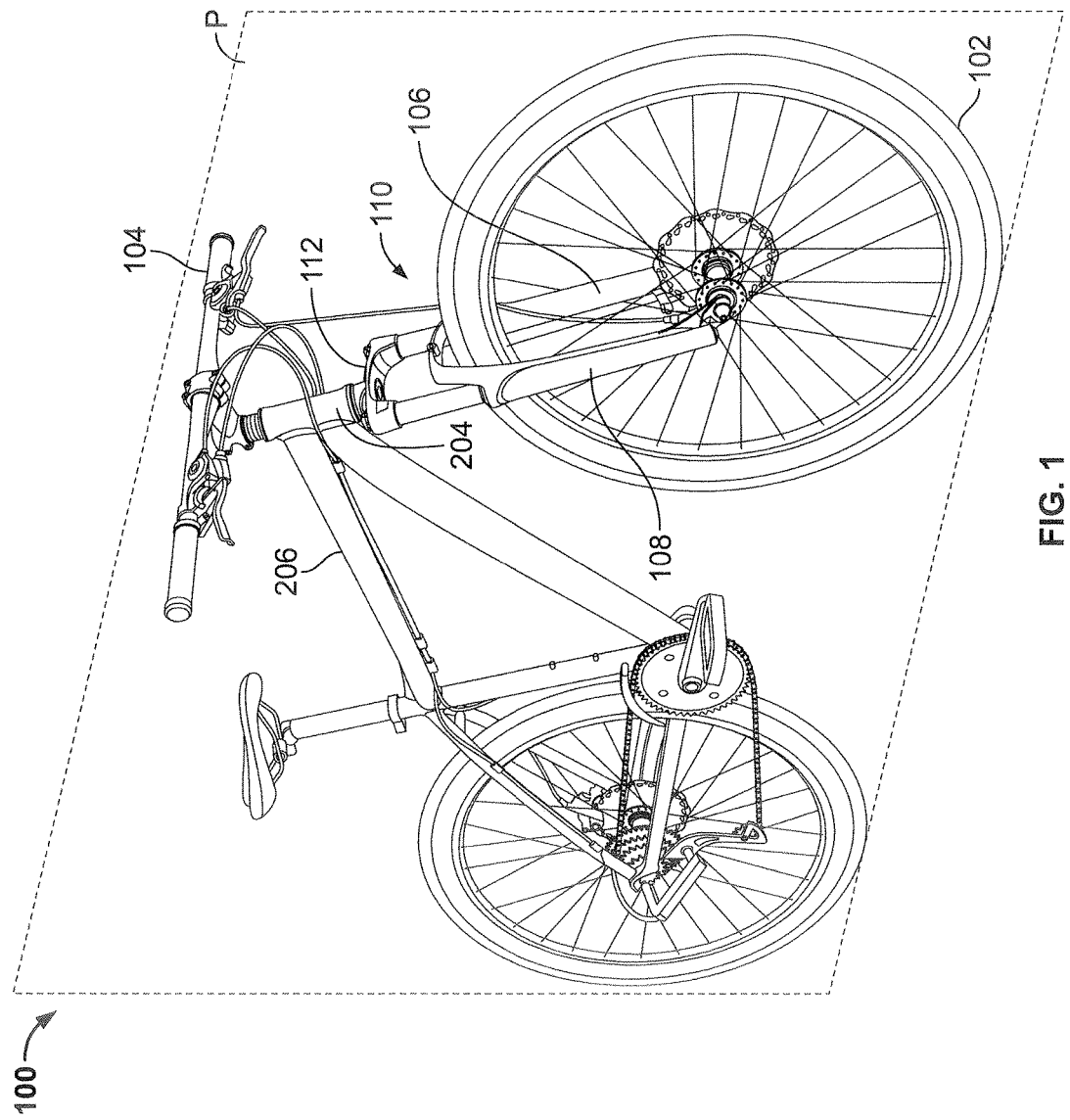
FIG. 1 is a perspective view of a representative bicycle.
Figure 2:
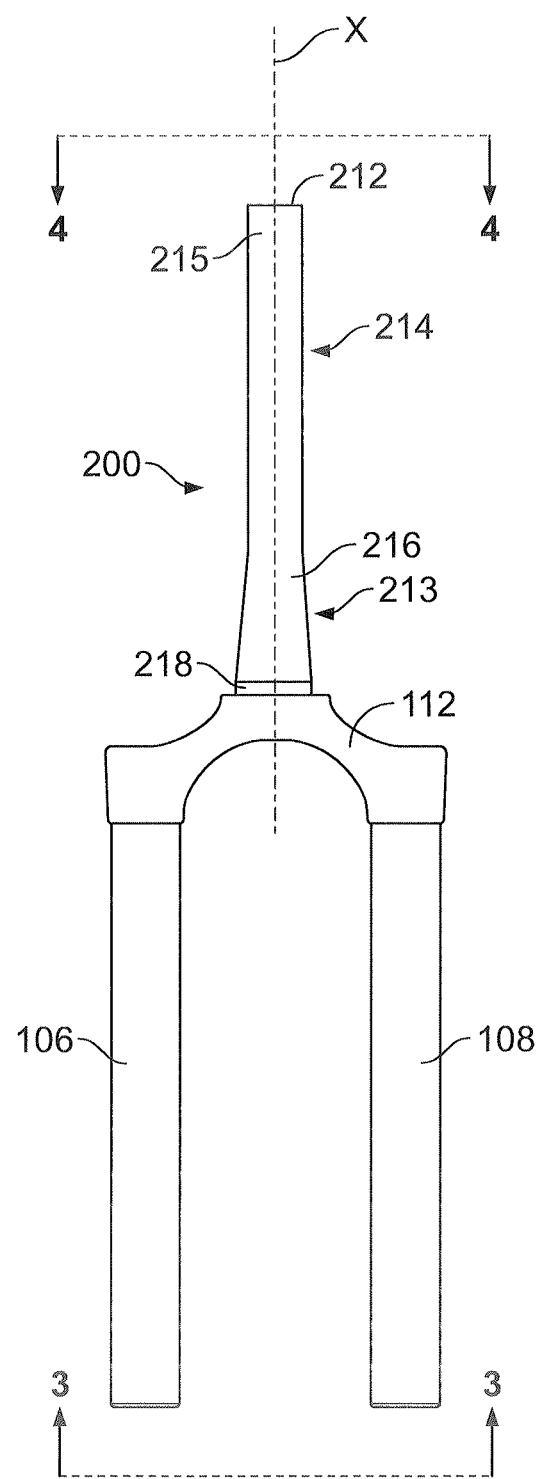
FIG. 2 is a front view of a bicycle fork as incorporating a steerer tube according to one embodiment of the invention.
Figure 3:
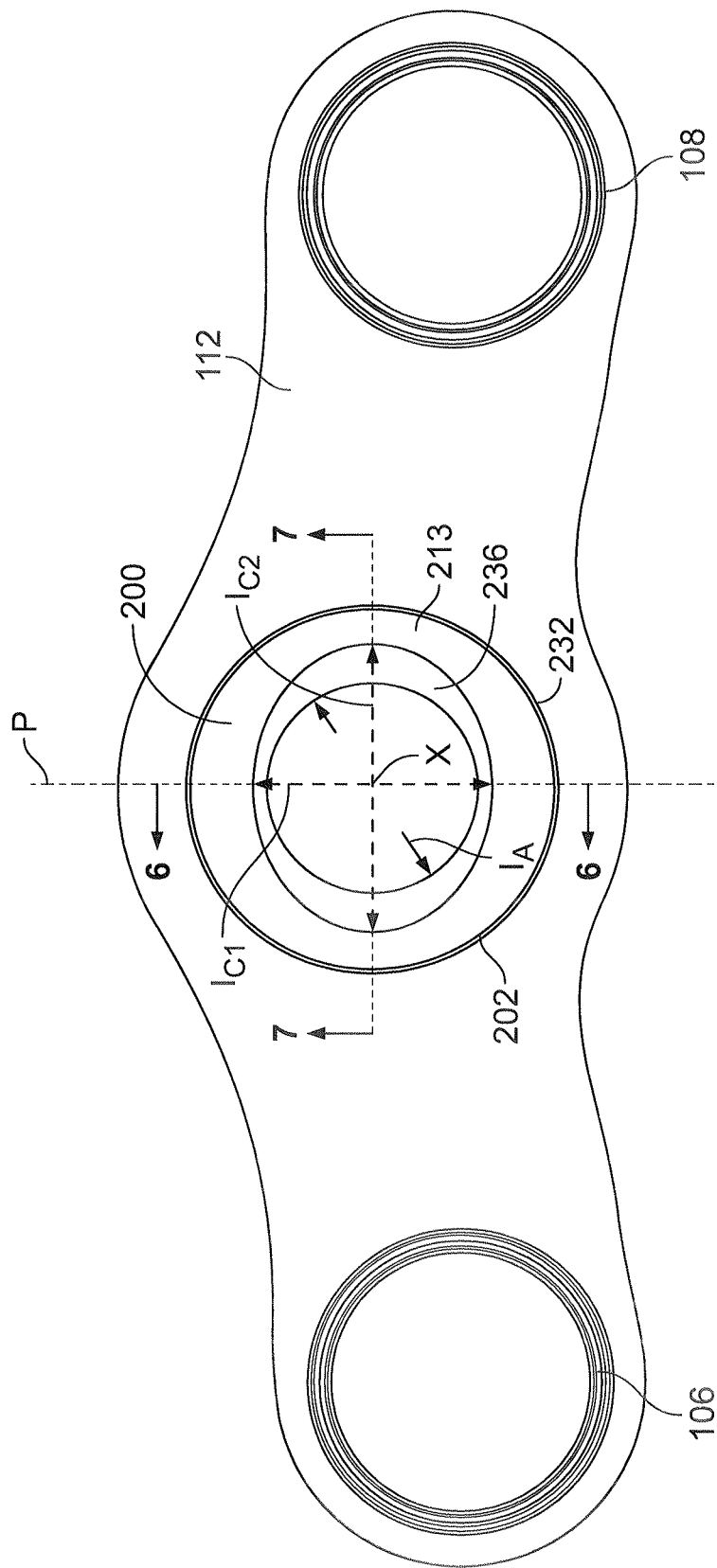
FIG. 3 is a bottom end view taken substantially along line 3-3 of FIG. 2.
Figure 4:
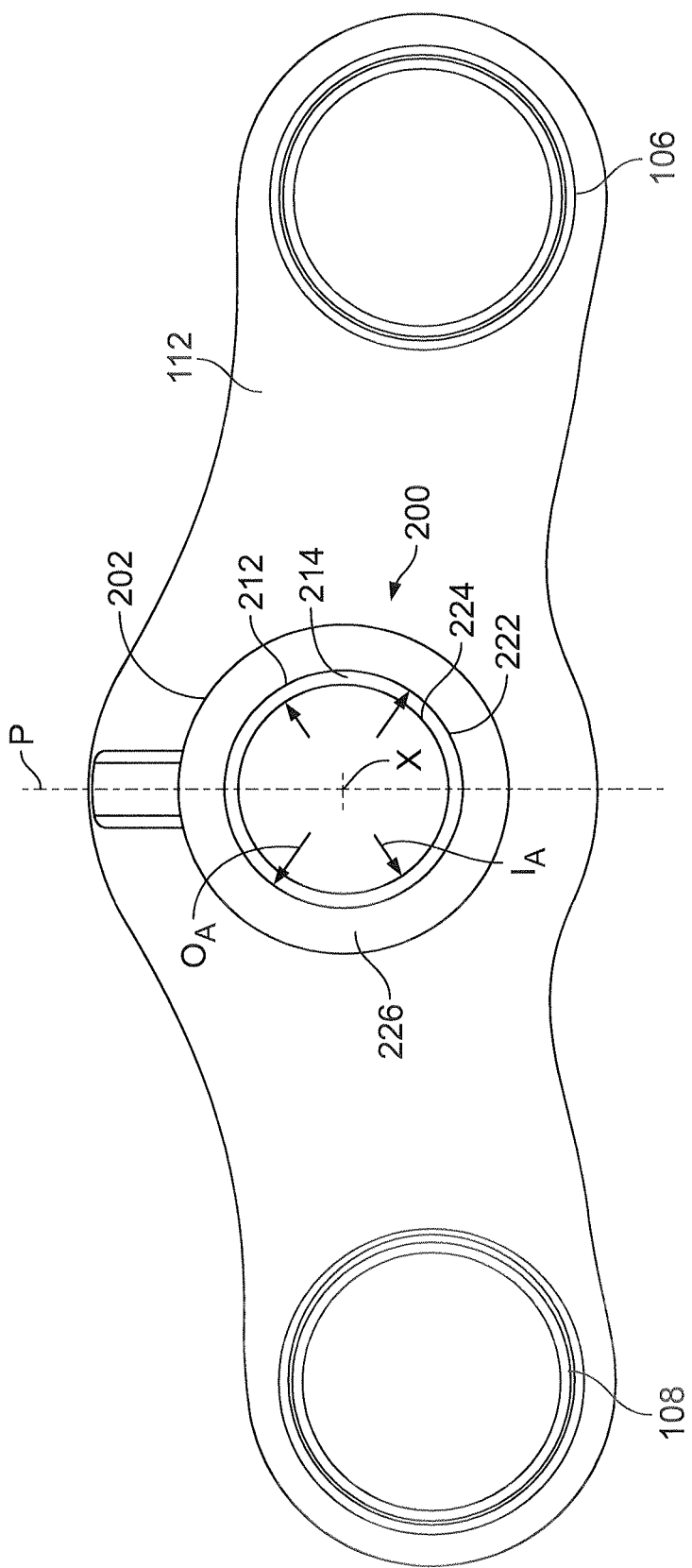
FIG. 4 is a top end view taken substantially along line 4-4 of FIG. 2.
Figure 5A:
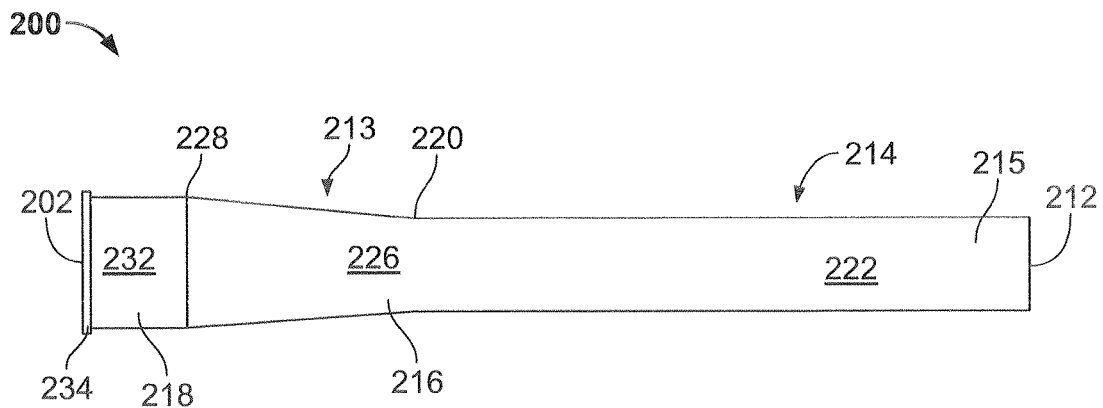
FIG. 5a is a side view of the steerer tube shown in FIG. 2.
Figure 5B:
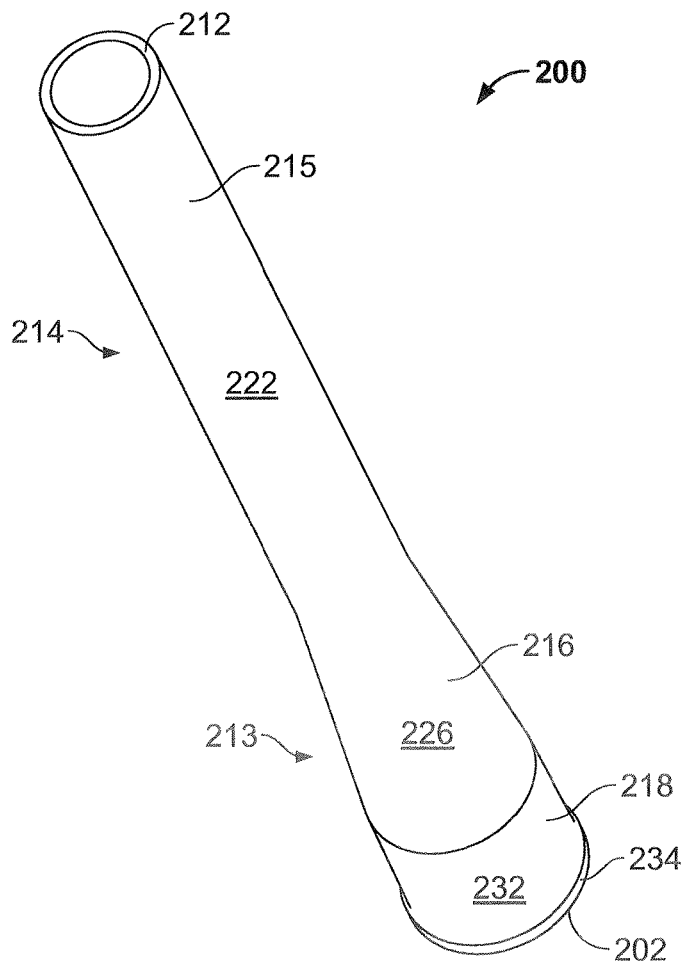
FIG. 5b is a perspective view of the steerer tube shown in FIG. 2.
Figure 8:
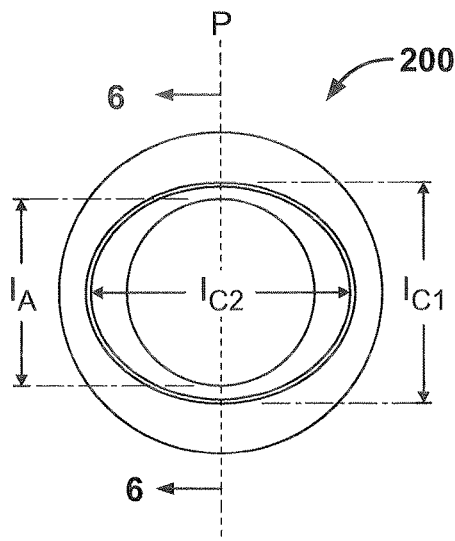
FIG. 8 is a bottom end view of the steerer tube of FIG. 6.
Figure 9:
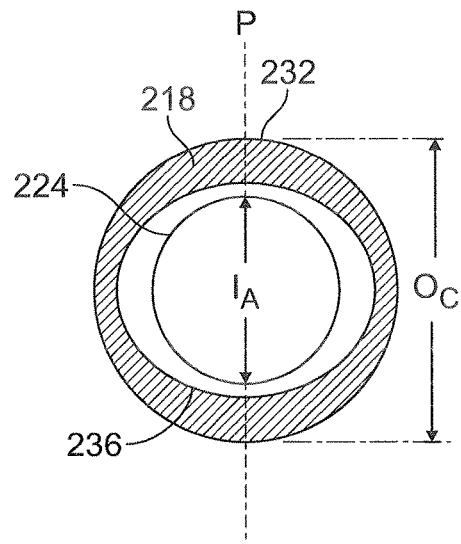
FIG. 9 is a sectional view taken substantially along line 9-9 of FIG. 6.
Figure 10:
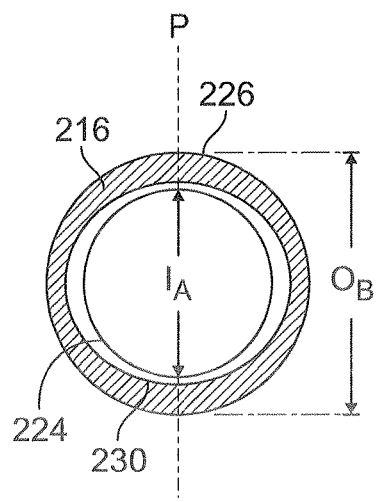
FIG. 10 is a sectional view taken substantially along line 10-10 of FIG. 6.
Figure 11:
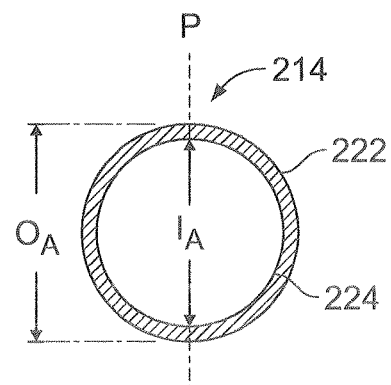
FIG. 11 is a sectional view taken substantially along line 11-11 of FIG. 6.

FIG. 2 illustrates a steerer tube 200 as used as a component of a mountain bike fork, although the present invention may be used with any bicycle type, including road bicycles and triathlon bicycles. The steerer tube 200 is particularly advantageous as used with a mountain bike, as the steerer tube stiffness within the plane of travel P ideally is enhanced relative to its stiffness orthogonal to plane P.

The embodiment of the steerer tube 200 shown in FIGS. 2-11 has an upper section 214 and a lower section 213 that in turn has a first or upper portion 216 and a second or lower portion 218. The upper section 214 extends from the upper end 212 of the steerer tube 200 to a lower end 220 of the upper section. A segment 215 of the upper section, adjacent to end 212, is adapted to be joined to handlebar 104. The upper section 214 has an outer surface 222 which is circularly cylindrical throughout the length of the upper section 214, and an inner surface 224 which is also circularly cylindrical throughout the length of the upper section 214. Upper section 214 has an invariant outer diameter $O_A$, which in one embodiment may be in the range of 25 mm to 40 mm and more preferably can be about 28.5 mm, and an invariant inner diameter $I_A$, which in one embodiment may be in the range of 20 mm to 36 mm and more preferably can be about 24.6 mm. While the segment 215 of the upper section 214 is circularly cylindrical so as to be more easily compatible with a star nut (not shown), in an alternative embodiment, the segment 215 of the upper section 214 could be tapered or elliptical in cross section and still be compatible with a star nut.

In this embodiment, the upper portion 216 of lower section 213 has an outer surface 226 which is frustoconical. The lower end 220 of the upper section 214 acts as the upper end of the upper portion 216 of lower section 213. The upper portion 216 extends from its upper end 220 to a lower end 228; the lower end 228 is defined by the termination of the sloped outer surface 226. In this embodiment, the outer surface 226 is circular in cross section and has an outer diameter $O_B$ which increases linearly from outer diameter $O_A$, at its upper end 220, to an outer diameter $O_C$ at its lower end 228. Said another way, the outer surface 226 of upper portion 216 gradually tapers in diameter from $O_C$ to $O_A$ as one proceeds upwardly along axis X. More generally, outer diameter $O_C$ can be greater than outer diameter $O_A$. In one embodiment, the outer diameter $O_C$ can be in the range of 25 mm to 50 mm and more preferably can be about 39.9 mm. Upper portion 216 can be about 76 mm long.

In this embodiment, the inner surface 230 of upper portion 216 has a shape which changes as a function of the distance from upper end 220. At upper end 220, the inner surface 230 is circular in cross section. As one proceeds towards upper portion lower end 228, the cross section becomes more and more elliptical. FIG. 6 is an axial sectional view aligned with the minor axis of the ellipse formed by the inner surface 230 of upper portion 216. The minor diameter $I_{B1}$ of surface 230 linearly increases as a function of distance from upper end 220, but the rate of increase is relatively small. As shown in FIG. 7, the major diameter $I_{B2}$ of surface 230 is the same as $I_A$ at upper end 220 but then increases linearly as a function of the distance away from upper end 220.

Figure 12:
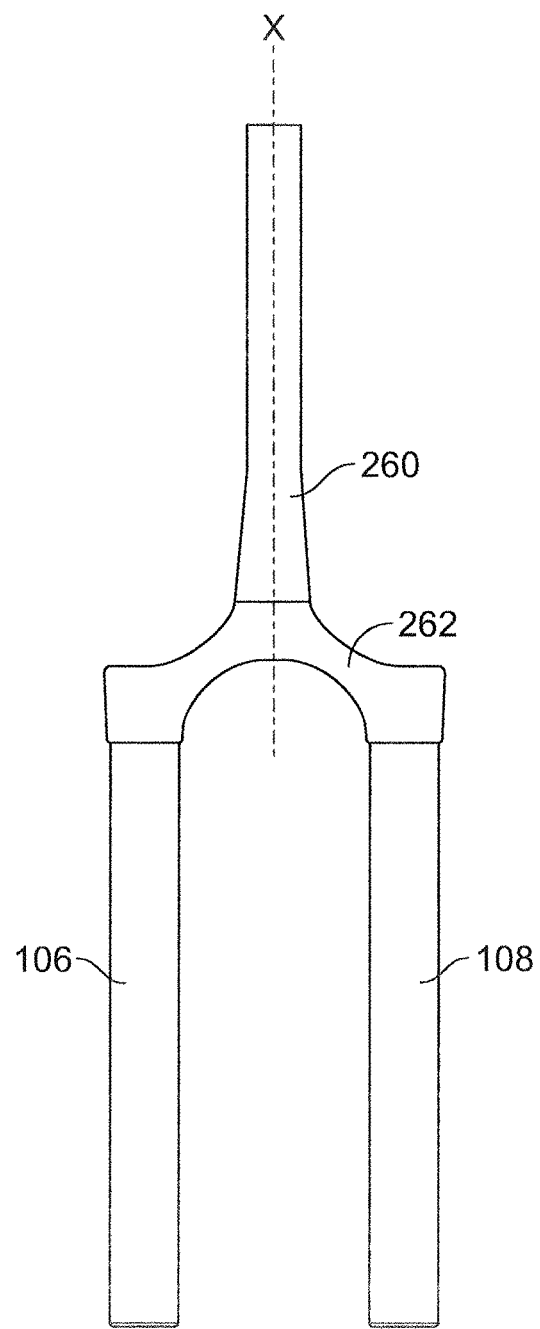
FIG. 12 is a front view of a bicycle fork as incorporating a steerer tube according to another embodiment of the invention.
Figure 15:
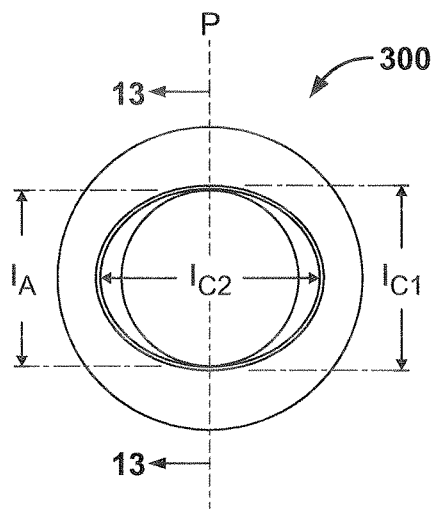
FIG. 15 is a bottom end view of the steerer tube of FIG. 13.
Figure 16:
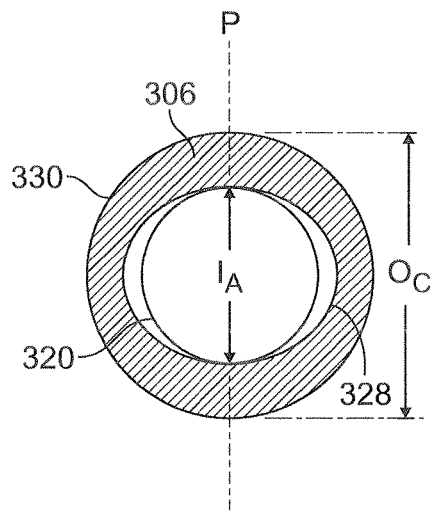
FIG. 16 is a sectional view taken substantially along line 16-16 of FIG. 13.
Figure 17:
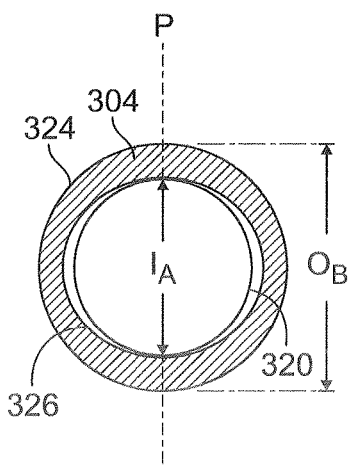
FIG. 17 is a sectional view taken substantially along line 17-17 of FIG. 13.
Figure 18:
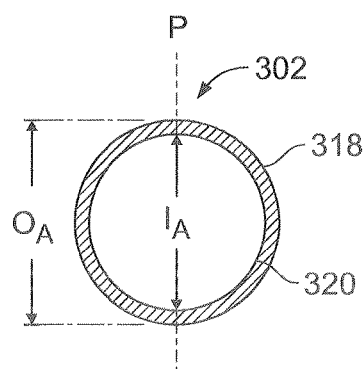
FIG. 18 is a sectional view taken substantially along line 18-18 of FIG. 13.
Figure 19:
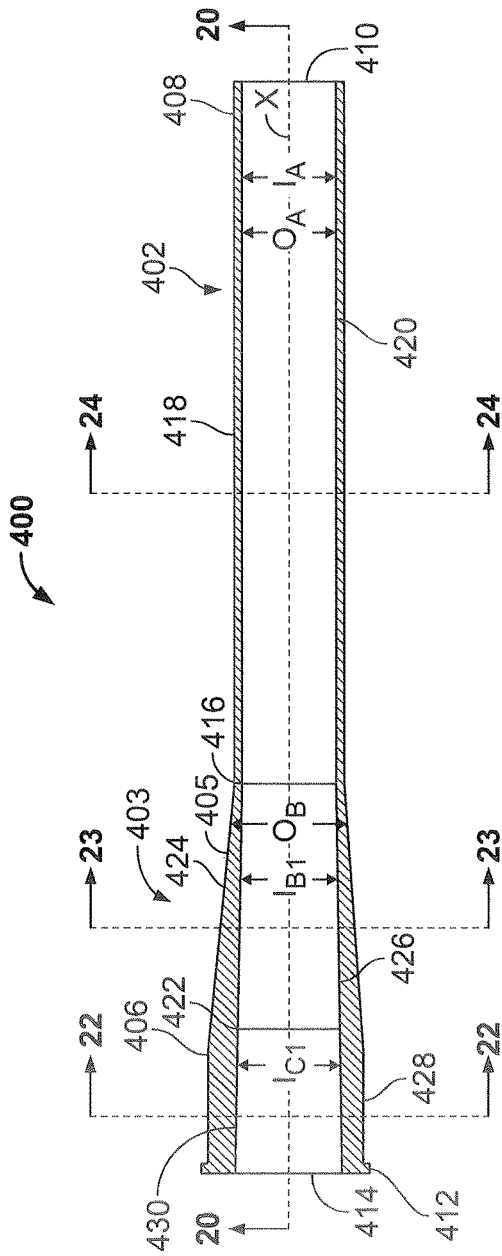
FIG. 19 is an axial sectional view of a steerer tube according to another embodiment of the invention.
Figure 20:
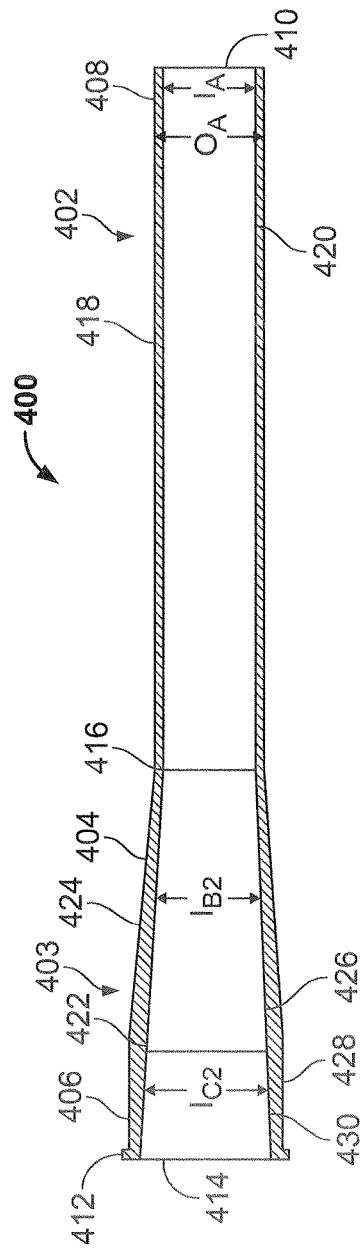
FIG. 20 is an axial sectional view taken substantially along line 20-20 of FIG. 19.
Figure 21:
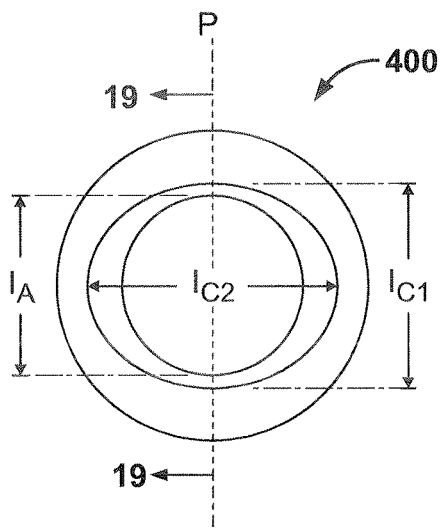
FIG. 21 is a bottom end view of the steerer tube of FIG. 19.
Figure 22:
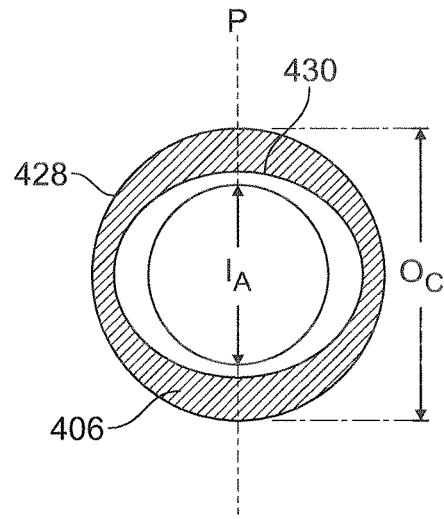
FIG. 22 is a sectional view taken substantially along line 22-22 of FIG. 19.
Figure 23:
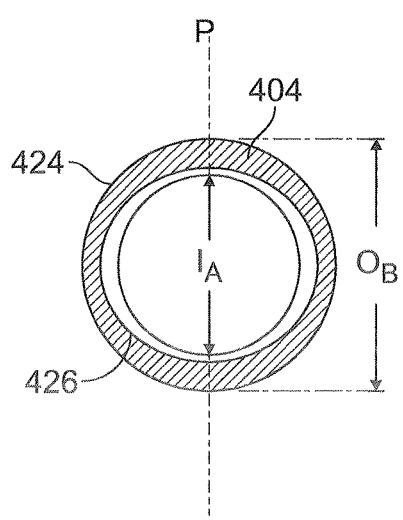
FIG. 23 is a sectional view taken substantially along line 23-23 of FIG. 19.
Figure 24:
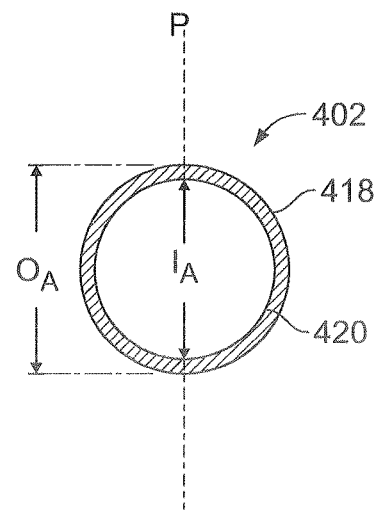
FIG. 24 is a sectional view taken substantially along line 24-24 of FIG. 19.
Figure 25:
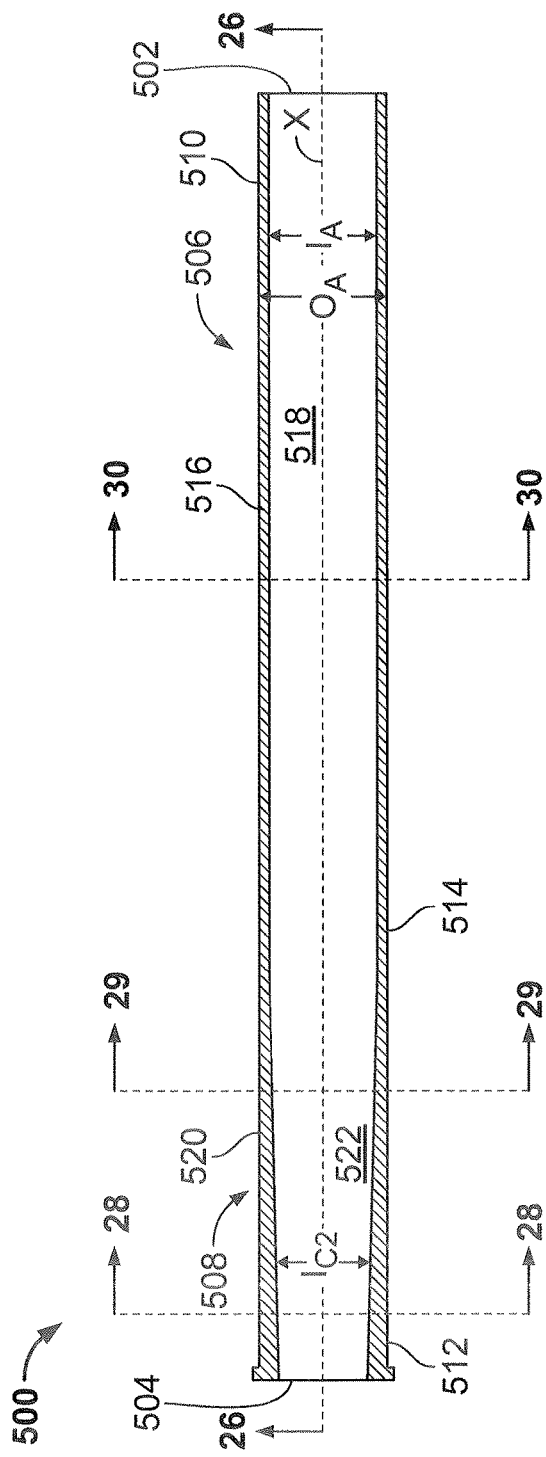
FIG. 25 is an axial sectional view of a steerer tube according to another embodiment of the invention.
Figure 26:
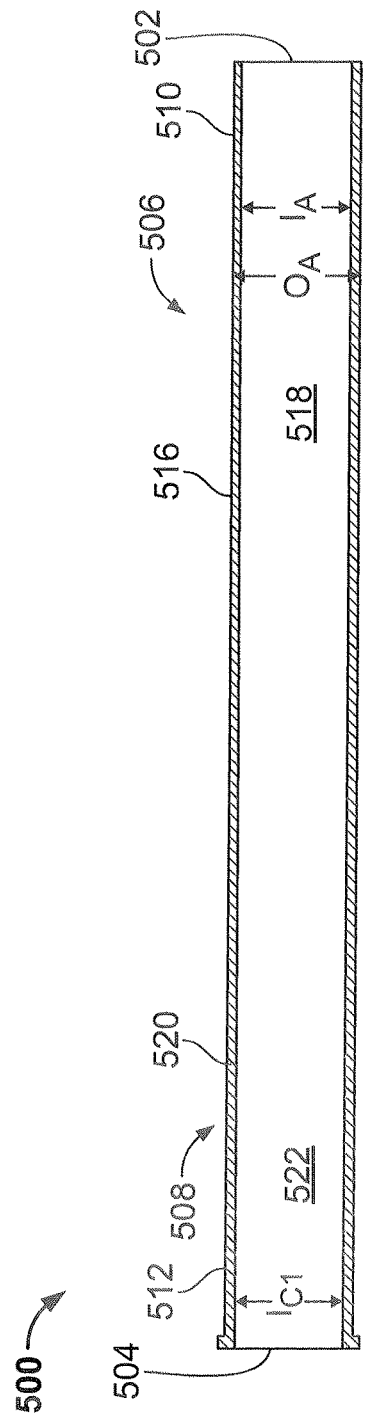
FIG. 26 is an axial sectional view taken substantially along line 26-26 of FIG. 25
Figure 27:
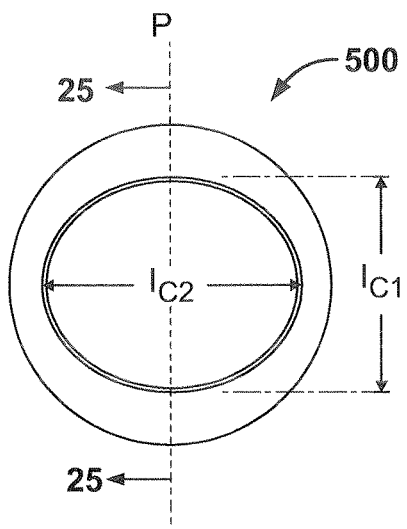
FIG. 27 is a bottom end view of the steerer tube of FIG. 25.
Figure 28:
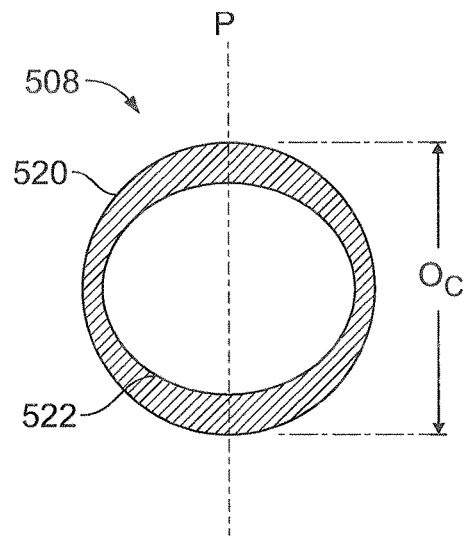
FIG. 28 is a sectional view taken substantially along line 28-28 of FIG. 25.
Figure 29:
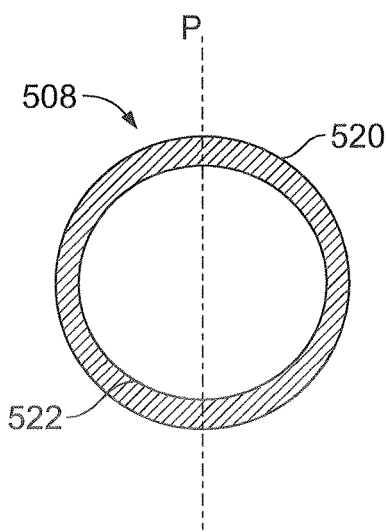
FIG. 29 is a sectional view taken substantially along line 29-29 of FIG. 25.
Figure 30:
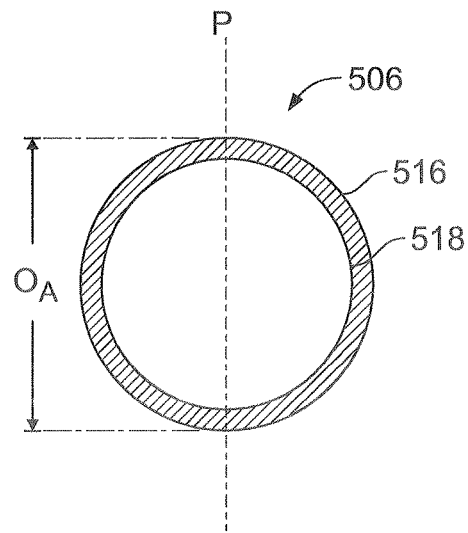
FIG. 30 is a sectional view taken substantially along line 30-30 of FIG. 25.

The wall thickness of the tube 200 at the crown 112 is generally greater than the wall thickness of the upper section 214, as the stress on tube 200 is highest at its junction with crown 112. The lower portion 218 of the lower section 213 of steerer tube 200 is characterized in that its outer surface 232 is circularly cylindrical. Lower portion 218 extends downwardly from upper portion end 228, which is the same as the lower end of upper portion 216, to lower end 202 of the steerer tube. A segment 234 of lower portion 218, adjacent to the lower end 202, is formed in this embodiment to include a ring of increased diameter (such as about 42 mm) and is adapted for affixation to fork crown 112. In another embodiment shown in FIG. 12, a steerer tube 260 and a fork crown 262 may be integrally formed rather than assembled and in those embodiments a raised ring may be missing. An outer diameter $O_C$ of the outer surface 232 may be in the range of 25 mm to 50 mm and more preferably can be chosen to be 39.9 mm. Lower portion 218 can be at least 25 mm long.

In this embodiment, lower portion 218 has an inner surface 236 which continues to change cross-sectional shape as one proceeds to tube end 202. In this illustrated embodiment, while the outer surface 232 makes a shoulder with outer surface 222 of the upper portion 216 at end 228, the shape of inner surface 236 changes continuously and linearly from upper portion inner surface 230, with no discernable break or bend at portion end 228. In this illustrated embodiment, the lower portion inner surface minor diameter $I_{C1}$ will continue to slowly increase as steerer tube end 202 is approached. The lower portion inner surface major diameter $I_{C2}$ will continue to linearly increase at a faster rate.

In this and other embodiments, a ratio of $I_{C2}$ to $I_{C1}$, taken at tube end 202, can be in the range of 1.05 to 1.3, and more preferably is in the range of 1.10 to 1.25. The combined lengths of upper portion 216 and lower portion 218 can be chosen to be between 40 mm and 200 mm and in one embodiment can be about 101 mm. In this and other embodiments, a ratio of the upper section inner diameter $I_A$ to the upper section outer diameter $O_A$ can be chosen to be in the range of 0.75 to 0.95.

Steerer tube 200 (and the other embodiments 300, 400, 500 and 600 herein described) may be fabricated of aluminum, steel, magnesium, titanium or carbon fiber reinforced composite. Steerer tube 200 may be made of a material that is the same or different from the rest of fork 110.

In the embodiment illustrated in FIGS. 13-18, a steerer tube indicated generally at 300 continues to have an upper section 302 and a lower section 303, the lower section in turn having an upper portion 304 and a lower portion 306, similar to the embodiment shown in FIGS. 2-11. An upper segment 308 adjacent to an upper tube end 310 is adapted to be affixed to a bicycle handlebar 104. A lower segment 312 adjacent to a lower tube end 314, herein shown as including a raised annulus or ring, is adapted to be affixed to a fork crown 112.

Upper section 302 extends from upper tube end 310 to a lower end 316 of upper section 302. An outer surface 318 and an inner surface 320 of upper section 302 are circularly cylindrical throughout the length of upper section 302, as before. Upper section 302 may have an outer diameter $O_A$ and an inner diameter $I_A$ with measurements and/or ratios to each other similar to those described for the embodiment illustrated in FIGS. 2-11.

First or upper portion 304 of lower section 303 extends from its upper end 316 (which is the same as the lower end of the upper section 302) to a lower end 322. An outer surface 324 of the upper portion 304 is frustoconical in shape; its outer diameter $O_B$ increases linearly from upper end 316 to lower end 322. The lower end 322 is defined by the termination of the sloped outer surface 324. An inner surface 326 of the upper portion 304 changes cross-sectional shape from circular to elliptical, and the eccentricity of the ellipse increases as the lower end 322 is approached. A major diameter $I_{B2}$ of upper portion inner surface 326 increases linearly as the lower end 322 is approached. A minor diameter $I_{B1}$ of upper portion inner surface 326 stays the same as upper section inner diameter $I_A$.

Second or lower portion 306 of lower section 303 extends from its upper end 322, which is the same as the lower end of upper portion 304, to lower tube end 314. The lower portion 306 has an outer surface 330 that is circularly cylindrical. The lower portion 306 has an inner surface 328 which continues to change cross-sectional shape as one proceeds to lower tube end 314. In this illustrated embodiment, while the outer surface 330 makes a shoulder with outer surface 324 of the upper portion 304 at end 322, the shape of the inner surface 328 changes continuously and linearly from the upper portion inner surface 326, with no discernable break or bend at end 322. The lower portion inner surface major diameter $I_{C2}$ increases linearly as steerer tube end 314 is approached. The lower portion inner surface minor diameter $I_{C1}$ stays the same as upper section inner diameter $I_A$.

In the embodiment illustrated in FIGS. 19-24, a steerer tube indicated generally at 400 continues to have an upper section 402 and a lower section 403, the lower section in turn having an upper portion 404 and a lower portion 406, similar to the embodiment shown in FIGS. 2-11. An upper segment 408 adjacent to an upper tube end 410 is adapted to be affixed to bicycle handlebar 104. A lower segment 412 adjacent to a lower tube end 414, herein shown as including a raised annulus or ring, is adapted to be affixed to fork crown 112.

Upper section 402 extends from tube end 410 to a lower end 416 of upper section 402. An outer surface 418 and an inner surface 420 of upper section 402 are circularly cylindrical throughout the length of upper section 402, as before. Upper section 402 may have an outer diameter $O_A$ and an inner diameter $I_A$ with measurements and/or ratios to each other similar to those described for the embodiment illustrated in FIGS. 2-11.

First or upper portion 404 of lower section 403 extends from its upper end 416 (which is the same as the lower end of the upper section 402) to a lower end 422. An outer surface 424 of the upper portion 404 is frustoconical in shape; its outer diameter $O_B$ increases linearly from end 416 to end 422. An inner surface 426 of the upper portion 404 changes cross-sectional shape from circular to elliptical, and the eccentricity of the ellipse increases as the lower end 422 of upper portion 404 is approached. A major diameter $I_{B2}$ of upper portion inner surface 426 increases linearly as lower end 422 is approached. A minor diameter $I_{B1}$ of upper portion inner surface 426 also increases linearly as lower end 422 is approached, but at a slower rate than the rate of increase of $I_{B2}$.

The second or lower portion 406 of lower section 403 extends from its upper end 422 (which is the same as the lower end of upper portion 404) to the lower tube end 414. An outer surface 428 of the lower portion 406 is circularly cylindrical and has an outer diameter $O_C$, of dimensions similar to those chosen for the embodiment shown in FIGS. 2-11. An inner surface 430 of the lower portion 406 is elliptically cylindrical; the cross-sectional ellipse taken at end 422 is the same as the cross-sectional ellipse taken at end 414. Major inner diameter $I_{C2}$ and minor inner diameter $I_{C1}$ are the same at end 422 as they are at end 414.

FIGS. 25-30 illustrate another embodiment of a steerer tube 500 of the invention. The steerer tube 500 has an upper end 502 and a lower end 504. The steerer tube 500 is divided into an upper section 506 and a lower section 508; section 508 has no distinct upper and lower portions. An upper segment 510 adjacent tube upper end 502 is adapted to be affixed to handlebar 104. A lower segment 512, here including a raised ring, is disposed adjacent lower tube end 504 and is adapted to be affixed to fork crown 112.

Upper section 506 extends from upper tube end 502 to a lower end 514. Both an outer surface 516 of section 506 and an inner surface 518 of section 506 are circularly cylindrical throughout the length of upper section 506. Inner surface 518 has a constant diameter $I_A$ and outer surface 516 has a constant outer diameter $O_A$.

Lower section 508 extends from its upper end 514, which is the same as the lower end of the upper section 506, to the tube end 504. An outer surface 520 of the lower section 508 is circularly cylindrical and may have an outer diameter $O_C$. Outer diameter $O_C$ may be chosen to be the same as outer diameter $O_A$ and in this instance outer surface 520 will be linearly continuous with outer surface 516 of upper section 506. The dimension of outer diameter $O_C$ can be chosen to be similar to that described in the first embodiment (FIGS. 2-11).

An inner surface 522 of the lower section 508 changes shape as one proceeds from its upper end 514 to the tube end 504. At end 514, the inner surface 522 has a circular cross section such that its minor diameter $I_{C1}$ is the same as its major diameter $I_{C2}$, and at end 514 these are the same as upper section inner diameter $I_A$. As one approaches tube end 504, major diameter $I_{C2}$ will increase linearly. Minor diameter $I_{C1}$ will also increase linearly, but at a slower rate. Therefore, the eccentricity of the cross-sectional ellipse of inner surface 522 will increase and will be greatest at end 504. At end 504, the ratio of $I_{C2}$ to $I_{C1}$ can be chosen from the range of 1.05 and 1.3, and more preferably from within the range of 1.10 to 1.25, similar to the ratios expressed for the embodiment shown in FIGS. 2-11.

While the above embodiments show an inner surface of the steerer tube transitioning between a circular cross section and an elliptical cross section, in another embodiment the inner surface of a steerer tube may have an elliptical cross section throughout the length of the steerer tube as shown in FIGS. 31-36. The steerer tube 600 has the upper section 614 and a lower section 613. The lower section 613 has an upper portion 616 and a lower portion 618. The upper section 614 extends from an upper end 612 of the steerer tube 600 to a lower end 620 of the upper section 614. A segment 615 of the upper section, adjacent to end 612, is adapted to be joined to handlebar 104. The upper section 614 has an outer surface 622 which is circularly cylindrical throughout the length of the upper section 614 and an inner surface 624 which is elliptical in cross section throughout the length of the upper section 614. Upper section 614 has an invariant outer diameter $O_A$ and an invariant inner minor diameter $I_{A1}$ and an invariant inner major diameter $I_{A2}$.

The upper section 616 of lower section 613 has an outer surface 626 which is frustoconical. The lower end 620 of the upper section 614 acts as the upper end of the upper portion 616 of lower section 613. The upper portion 616 extends from its upper end 620 to a lower end 628; the lower end 628 is defined by the termination of the sloped outer surface 626. In this embodiment, the outer surface 626 is circular in cross section and has an outer diameter $O_B$ which increases linearly from outer diameter $O_A$ at is upper end 620, to an outer diameter $O_C$ at its lower end 628.

Figure 31:
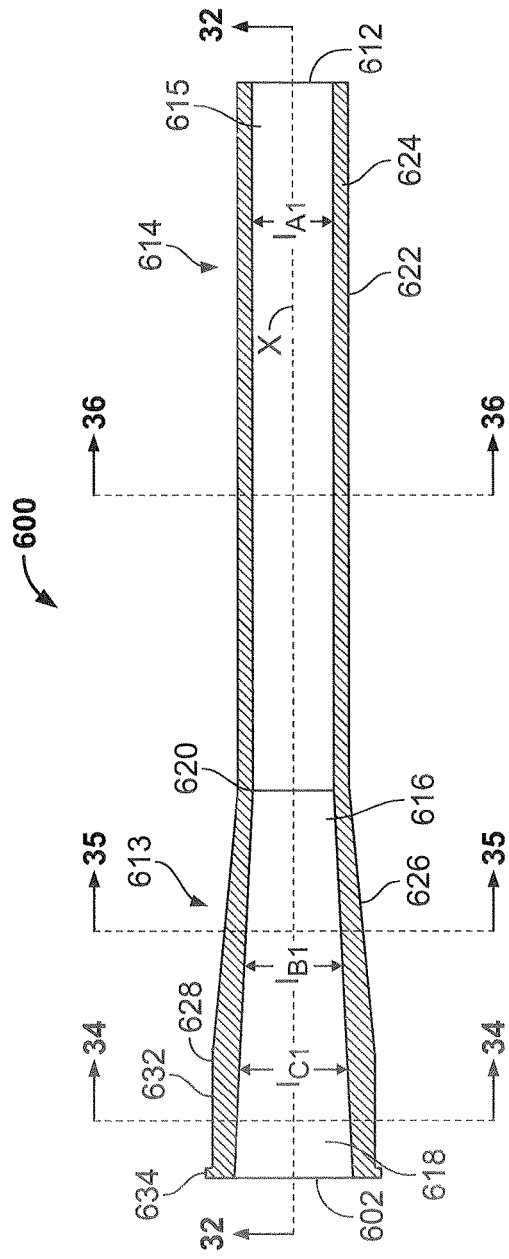
FIG. 31 is an axial sectional view of a steerer tube according to another embodiment of the invention.
Figure 32:
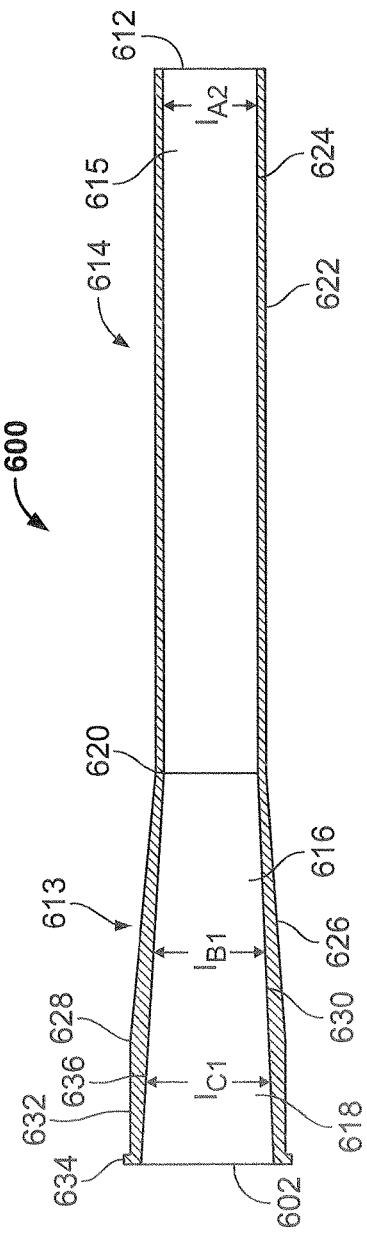
FIG. 32 is an axial sectional view taken substantially along line 32-32 of FIG. 31.
Figure 33:
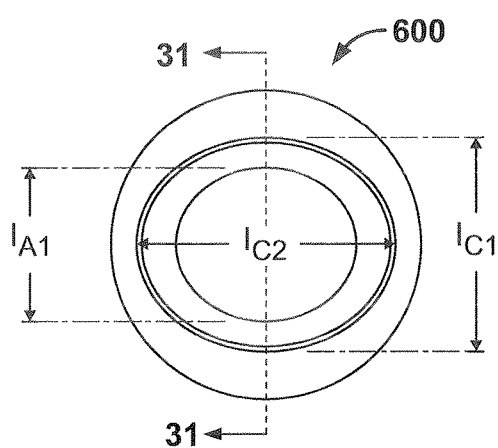
FIG. 33 is a bottom end view of the steerer tube of FIG. 31.
Figure 34:
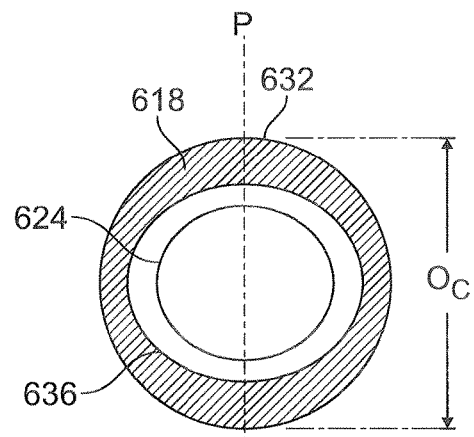
FIG. 34 is a sectional view taken substantially along line 34-34 of FIG. 31.
Figure 35:
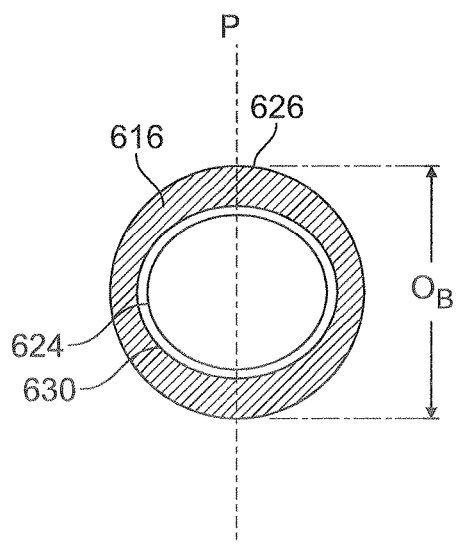
FIG. 35 is a sectional view taken substantially along line 35-35 of FIG. 31.
Figure 36:
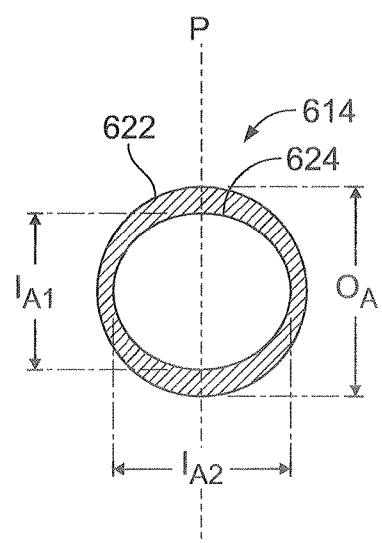
FIG. 36 is a sectional view taken substantially along line 36-36 of FIG. 31.

The inner surface 630 of upper section 616 has a shape which changes as a function of the distance from upper end 620. At upper end 620, the inner surface 630 is elliptical in cross section. As one proceeds towards upper portion lower end 628, the cross section becomes more and more elliptical. FIG. 31 is an axial sectional view aligned with the minor diameter of the ellipse formed by the inner surface of upper portion 616. The minor diameter $I_{B1}$ of surface 630 linearly increases as a function of distance from upper end 620, but the rate of increase is relatively small. As shown in FIG. 32, the major diameter $I_{B2}$ of surface 630 is the same as $I_{A2}$ at upper end 620 but then increases linearly as a function of the distance away from upper end 620.

The lower section 618 of the lower section 613 of steerer tube 600 is characterized in that its outer surface 632 is circularly cylindrical. Lower portion 618 extends downwardly from upper portion end 628, which is the same as the lower end of upper portion 616, to lower end 602 of the steerer tube. A segment 634 of lower portion 618, adjacent to the lower end 602, is adapted for affixation to the fork crown 112.

In this embodiment, lower portion 618 has an inner surface 636 which continues to change cross-sectional shape as one proceeds to tube end 602. While the outer surface 632 makes a shoulder with outer surface 622 of the upper section 616 at end 628, the shape of the inner surface 636 changes continuously and linearly from upper portion inner surface 630, with no discernable break or bend at portion end 628. The lower portion inner surface minor diameter $I_{C2}$ will continue to slowly increase as steerer tube end 602 is approached. The lower portion inner surface major diameter $I_{C2}$ will continue to linearly increase at a faster rate. At end 602, the ratio of $I_{C2}$ and $I_{C1}$ can be chosen from the range of 1.05 and 1.3, and more preferably from within the range of 1.10 to 1.25, similar to the ratios expressed for the embodiment shown in FIGS. 2-11.

In summary, steerer tube embodiments have been illustrated and described which have lower sections, or portions of same, with a wall thickness in the plane of travel that is greater than the wall thickness outside of the plane of travel, and which therefore exhibit a greater stiffness fore and aft than they do side-to-side. The outer surface of the lower portion of the lower tube section nonetheless may be specified as circularly cylindrical as an aid to its assembly to other fork elements.

While illustrated embodiments of the present invention have been described and illustrated in the appended drawings, the present invention is not limited thereto but only by the scope and spirit of the appended claims.

The claims are as follows:

1. A steerer tube for a bicycle, the steerer tube comprising:
an elongate hollow body arranged around a steering axis located in a vertical plane of travel of the bicycle,
the body having upper and lower sections, a segment of the upper section adapted to be joined to a bicycle handlebar, a segment of the lower section adapted to be joined to a crown of a front wheel fork of the bicycle, the lower section joined to the upper section, and outer surfaces of the upper and lower sections of the body being circular in cross section, and
the body formed by a wall, a thickness of the wall at any point in the lower section of the body varying as a function of the cross-sectional angle of the point relative to the plane of travel, the wall thickness being at a maximum in the plane of travel of the bicycle.

2. The steerer tube of claim 1, wherein an outer diameter of the lower section of the body is greater than an outer diameter of the upper section of the body.

3. The steerer tube of claim 2, wherein the lower section of the body has first and second portions, the first portion adjoining the upper section of the body, an outer diameter of the first portion of the lower section being greater than an outer diameter of the upper section and less than an outer diameter of the second portion of the lower section.

4. The steerer tube of claim 3, wherein the outer diameter of the first portion of the lower section gradually tapers from the second portion of the lower section to the upper section of the body.

5. The steerer tube of claim 4, wherein an inner surface of the upper section forms an ellipse in cross section, a major diameter of the ellipse formed to be perpendicular to the plane of travel, a minor diameter of the ellipse formed to be in the plane of travel of the bicycle.

6. The steerer tube of claim 4, wherein an inner surface of the upper section is circular in cross section.

7. The steerer tube of claim 6, wherein the inner and outer surfaces of the upper section are substantially circularly cylindrical and the outer surface of the second portion of the lower section is substantially circularly cylindrical.

8. The steerer tube of claim 6, wherein a ratio of an inner diameter of the upper section of the body to an outer diameter of the upper section of the body is within the range of 0.75 to 0.95, inclusive.

9. The steerer tube of claim 1, wherein an outer diameter of the lower section of the body is substantially the same as an outer diameter of the upper section of the body.

10. The steerer tube of claim 1, wherein an inner surface of the upper section is circular in cross section.

11. The steerer tube of claim 10, wherein the inner and outer surfaces of the upper section are substantially circularly cylindrical and the outer surface of the lower section is substantially circularly cylindrical.

12. The steerer tube of claim 10, wherein a ratio of an inner diameter of the upper section of the body to an outer diameter of the upper section of the body is within the range of 0.75 to 0.95, inclusive.

13. The steerer tube of claim 1, wherein the segment of the lower section of the body is formed as one piece with the crown of the front wheel fork.

14. The steerer tube of claim 1, wherein the body is formed from a material selected from the group consisting of steel, carbon fiber reinforced composite, aluminum, titanium and magnesium.

15. The steerer tube of claim 1, wherein the wall thickness is at a minimum in a plane containing the steering axis and orthogonal to the plane of travel of the bicycle.

16. The steerer tube of claim 15, wherein an outer diameter of the lower section of the body is greater than an outer diameter of the upper section of the body.

17. The steerer tube of claim 16, wherein the lower section of the body has first and second portions, the first portion adjoining the upper section of the body, an outer diameter of the first portion of the lower section being greater than an outer diameter of the upper section and less than an outer diameter of the second portion of the lower section.

18. The steerer tube of claim 17, wherein the outer diameter of the first portion of the lower section gradually tapers from the second portion of the lower section of the body to the upper section of the body.

19. The steerer tube of claim 18, wherein an inner surface of the upper section forms an ellipse in cross section, a major diameter of the ellipse formed to be perpendicular to the plane of travel, a minor diameter of the ellipse formed to be in the plane of travel of the bicycle.

20. The steerer tube of claim 18, wherein an inner surface of the upper section is circular in cross section.

21. The steerer tube of claim 20, wherein the inner and outer surfaces of the upper section are substantially circularly cylindrical and the outer surface of the second portion of the lower section is substantially circularly cylindrical.

22. The steerer tube of claim 20, wherein a ratio of an inner diameter of the upper section of the body to an outer diameter of the upper section of the body is within the range of 0.75 to 0.95, inclusive.

23. The steerer tube of claim 15, wherein an outer diameter of the lower section of the body is substantially the same as an outer diameter of the upper section of the body.

24. The steerer tube of claim 15, wherein an inner surface of the upper section is circular in cross section.

25. The steerer tube of claim 24, wherein the inner surface and an outer surface of the upper section are substantially circularly cylindrical and an outer surface of a portion of the lower section is substantially circularly cylindrical.

26. The steerer tube of claim 24, wherein a ratio of an inner diameter of the upper section of the body to an outer diameter of the upper section of the body is within the range of 0.75 to 0.95, inclusive.

27. The steerer tube of claim 15, wherein an outer diameter of the lower section of the body is greater than an outer diameter of the upper section of the body.

28. The steerer tube of claim 27, wherein the lower section of the body has first and second portions, the first portion adjoining the upper section of the body, an outer diameter of the first portion of the lower section being greater than an outer diameter of the upper section and less than an outer diameter of the second portion of the lower section.

29. The steerer tube of claim 28, wherein the outer diameter of the first portion of the lower section gradually tapers from the second portion of the lower section of the body to the upper section of the body.

30. The steerer tube of claim 15, wherein the segment of the lower section of the body is formed as one piece with the crown of the front wheel fork.

31. The steerer tube of claim 15, wherein the segment of the lower section of the body is joined to the crown of the front wheel fork, the body formed of a material different from the crown of the front wheel fork.

32. The steerer tube of claim 31, wherein the segment of the lower section of the body is formed as one piece with the crown of the front wheel fork.

33. The steerer tube of claim 15, wherein the body is formed from a material selected from the group consisting of steel, carbon fiber reinforced composite, aluminum, titanium and magnesium.

34. The steerer tube of claim 15, wherein an inner surface of the wall within the lower section of the body is formed as an ellipse in cross section, a major diameter of the ellipse formed to be perpendicular to the plane of travel, a minor diameter of the ellipse formed to be in the plane of travel of the bicycle.

35. The steerer tube of claim 34, wherein outer surfaces of the upper and lower sections of the body are circular in cross section.

36. The steerer tube of claim 35, wherein an outer diameter of the lower section of the body is greater than an outer diameter of the upper section of the body.

37. The steerer tube of claim 36, wherein the lower section of the body has first and second portions, the first portion adjoining the upper section of the body, an outer diameter of the first portion of the lower section being greater than an outer diameter of the upper section and less than an outer diameter of the second portion of the lower section.

38. The steerer tube of claim 37, wherein the outer diameter of the first portion of the lower section gradually tapers from the second portion of the lower section of the body to the upper section of the body.

39. The steerer tube of claim 38, wherein an inner surface of the upper section forms an ellipse in cross section, a major diameter of the ellipse formed to be perpendicular to the plane of travel, a minor diameter of the ellipse formed to be in the plane of travel of the bicycle.

40. The steerer tube of claim 38, wherein an inner surface of the upper section is circular in cross section.

41. The steerer tube of claim 40, wherein the inner and outer surfaces of the upper section are substantially circularly cylindrical and the outer surface of the second portion of the lower section is substantially circularly cylindrical.

42. The steerer tube of claim 40, wherein a ratio of an inner diameter of the upper section of the body to an outer diameter of the upper section of the body is within the range of 0.75 to 0.95, inclusive.

43. The steerer tube of claim 34, wherein an outer diameter of the lower section of the body is substantially the same as an outer diameter of the upper section of the body.

44. The steerer tube of claim 34, wherein an inner surface of the upper section is circular in cross section.

45. The steerer tube of claim 44, wherein the inner and outer surfaces of the upper section are substantially circularly cylindrical and the outer surface of the second portion of the lower section is substantially circularly cylindrical.

46. The steerer tube of claim 44, wherein a ratio of an inner diameter of the upper section of the body to an outer diameter of the upper section of the body is within the range of 0.75 to 0.95, inclusive.

47. The steerer tube of claim 34, wherein an outer diameter of the lower section of the body is greater than an outer diameter of the upper section of the body.

48. The steerer tube of claim 47, wherein the lower section of the body has first and second portions, the first portion adjoining the upper section of the body, an outer diameter of the first portion of the lower section being greater than an outer diameter of the upper section and less than an outer diameter of the second portion of the lower section.

49. The steerer tube of claim 48, wherein the outer diameter of the first portion of the lower section gradually tapers from the second portion of the lower section of the body to the upper section of the body.

50. The steerer tube of claim 34, wherein the segment of the lower section of the body is formed as one piece with the crown of the front wheel fork.

51. The steerer tube of claim 34, wherein the segment of the lower section of the body is joined to the crown of the front wheel fork, the body formed of a material different from the crown of the front wheel fork.

52. The steerer tube of claim 51, wherein the segment of the lower section of the body is formed as one piece with the crown of the front wheel fork.

53. The steerer tube of claim 34, wherein the body is formed from a material selected from the group consisting of steel, carbon fiber reinforced composite, aluminum, titanium and magnesium.

54. The steerer tube of claim 34, wherein an inner surface of the upper section is circular in cross section, an inner diameter of the upper section being substantially the same as the minor diameter of the lower section.

55. The steerer tube of claim 34, wherein the lower section has an axial length, the minor diameter remaining substantially the same along the axial length of the lower section.

56. The steerer tube of claim 34, wherein the minor diameter decreases as a function of proximity to the upper section of the body.

57. The steerer tube of claim 34, wherein a ratio of the major diameter to the minor diameter taken at a lower end of the lower section is within the range of 1.05 to 1.3, inclusive.

58. The steerer tube of claim 57, wherein the ratio is within the range of 1.10 to 1.25, inclusive.

59. The steerer tube of claim 34, wherein the major diameter of the lower section tapers from the second portion of the lower section to the first portion of the lower section.

60. The steerer tube of claim 34, wherein a ratio of the major diameter to the minor diameter decreases as a function of proximity to the upper section of the body.

61. A steerer tube for a bicycle, the steerer tube comprising:
an elongate hollow body arranged around a steering axis located in a vertical plane of travel of the bicycle,
the body having upper and lower sections, a segment of the upper section adapted to be joined to a bicycle handlebar, a segment of the lower section adapted to be joined to a crown of a front wheel fork of the bicycle, the lower section joined to the upper section,
and an outer diameter of the lower section of the body is greater than an outer diameter of the upper section of the body, and
the body formed by a wall, a thickness of the wall at any point in the lower section of the body varying as a function of the cross-sectional angle of the point relative to the plane of travel, the wall thickness being at a maximum in the plane of travel of the bicycle.

62. The steerer tube of claim 61, wherein the lower section of the body has first and second portions, the first portion adjoining the upper section of the body, an outer diameter of the first portion of the lower section being greater than an outer diameter of the upper section and less than an outer diameter of the second portion of the lower section.

63. The steerer tube of claim 62, wherein the outer diameter of the first portion of the lower section gradually tapers from the second portion of the lower section to the upper section of the body.

64. A steerer tube for a bicycle, the steerer tube comprising:
an elongate hollow body arranged around a steering axis located in a vertical plane of travel of the bicycle,
the body having upper and lower sections, a segment of the upper section adapted to be joined to a bicycle handlebar, a segment of the lower section adapted to be joined to a crown of a front wheel fork of the bicycle, the lower section joined to the upper section, and the segment of the lower section of the body is joined to the crown of the front wheel fork, the body formed of a material different from the crown of the front wheel fork, and
the body formed by a wall, a thickness of the wall at any point in the lower section of the body varying as a function of the cross-sectional angle of the point relative to the plane of travel, the wall thickness being at a maximum in the plane of travel of the bicycle.

65. The steerer tube of claim 64, wherein the segment of the lower section of the body is formed as one piece with the crown of the front wheel fork.

* * * * *